(12) United States Patent
Voss et al.

(10) Patent No.: US 9,873,236 B2
(45) Date of Patent: Jan. 23, 2018

(54) COATED SUBSTRATES

(71) Applicant: HEWLETT-PACKARD DEVELOPMENT COMPANY, L.P., Houston, TX (US)

(72) Inventors: Kevin Voss, Houston, TX (US); KT (Kuan-Ting) Wu, Taipei (TW); James Chang, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/517,699

(22) PCT Filed: Dec. 1, 2014

(86) PCT No.: PCT/US2014/067874
§ 371 (c)(1),
(2) Date: Apr. 7, 2017

(87) PCT Pub. No.: WO2016/089345
PCT Pub. Date: Jun. 9, 2016

(65) Prior Publication Data
US 2017/0313022 A1    Nov. 2, 2017

(51) Int. Cl.
*H01L 23/58* (2006.01)
*B32B 3/30* (2006.01)
(Continued)

(52) U.S. Cl.
CPC .............. *B32B 3/30* (2013.01); *B32B 7/02* (2013.01); *B05D 5/083* (2013.01); *B05D 7/52* (2013.01); *B32B 33/00* (2013.01)

(58) Field of Classification Search
USPC .......... 257/E29.324, E21.645–E21.694, 295, 257/E43.001–E43.007, E27.005–E27.006, 257/E27.008, E29.164, E29.167, E29.272, 257/E29.323, E27.104, E21.436, 257/E21.663–E21.665, 81, 82, 91, 257/98–100, 116, 117, 432–437, 749, 257/E33.056–E33.059, E25.032, 642; 438/3, 785, E21.208, 25–28; 156/296; 264/115, 119, 122, 209.1
See application file for complete search history.

(56) References Cited

U.S. PATENT DOCUMENTS

2007/0264437 A1    11/2007 Zimmermann et al.
2008/0250978 A1    10/2008 Baumgart et al.
(Continued)

FOREIGN PATENT DOCUMENTS

EP      1555249 A1        7/2005
JP   WO2007-075407   *   7/2007
(Continued)

*Primary Examiner* — Tram H Nguyen
(74) *Attorney, Agent, or Firm* — HP Inc. Patent Department

(57) ABSTRACT

A coated substrate may provide soft touch and superhydrophobicity. In example implementations herein, a substrate may be provided with a microstructure on at least a portion of at least one surface of the substrate. A first, water-based soft touch coating may be on at least a portion of the microstructure. A second, solvent-based superhydrophobic coating may be on at least a portion of the first coating.

15 Claims, 3 Drawing Sheets

(51) Int. Cl.
  *B32B 7/02* (2006.01)
  *B05D 5/08* (2006.01)
  *B05D 7/00* (2006.01)
  *B32B 33/00* (2006.01)

(56) References Cited

U.S. PATENT DOCUMENTS

| | | | |
|---|---|---|---|
| 2009/0196990 A1* | 8/2009 | Simpson | B05D 5/083 427/203 |
| 2012/0040577 A1* | 2/2012 | Kissel | C08K 9/06 442/81 |
| 2012/0088066 A1* | 4/2012 | Aytug | B82Y 30/00 428/141 |
| 2012/0107556 A1* | 5/2012 | Zhang | B08B 17/065 428/141 |
| 2013/0030098 A1 | 1/2013 | Megaridis et al. | |
| 2013/0178568 A1 | 7/2013 | Meuler et al. | |
| 2014/0087134 A1 | 3/2014 | Gesford et al. | |

FOREIGN PATENT DOCUMENTS

| | | |
|---|---|---|
| WO | WO-2007/075407 A1 | 7/2007 |
| WO | WO-2010/147738 A1 | 12/2010 |

* cited by examiner

COATED SUBSTRATES

BACKGROUND

Coatings for decorative and functional purposes are commonly used to modify substrate surfaces. For many modern applications, such as in devices that involve frequent human touch, soft touch coatings have been used to provide a desirable feeling to the touch. Relatedly, superhydrophobic materials have been used to coat certain surfaces to provide water repellency and self-cleaning properties to the surfaces. Such coatings are used to provide desirable surface properties to the exteriors of electronic devices, particularly to surfaces frequently exposed to contact.

BRIEF DESCRIPTION OF THE DRAWINGS

The following detailed description references the drawings, wherein.

DETAILED DESCRIPTION

Thin films and coatings are becoming increasingly significant in various industries, including applications in microelectronics, optics, nano-technology, magnetics, electro-optics, and electrochemistry. Coatings allow for the manipulation of physical properties of materials by altering the surface properties of the materials. In particular, superhydrophobic coatings can provide surfaces that are very repellent to water and, in some cases, oils and other liquids. Furthermore, soft touch coatings provide appealing textures on surfaces that may be desirable for user contact.

However, several issues may be present with existing solutions. Soft touch coatings may provide the soft touch textures with one or more solvent-based soft touch coating layers. Solvent-based coatings may emit volatile organic compounds (VOC). Paired with the fact that soft touch coatings may need a significant thickness to achieve a soft touch tactile feeling, some soft touch coatings may emit relatively high amounts of VOCs. This presents challenges because VOCs are undesirable and because superhydrophobicity is difficult to achieve with water-based coatings.

Examples disclosed herein provide for coated substrates with a first, water-based coating and a second, solvent-based coating. In example implementations, a substrate with a microstructure is provided. A first coating, which is a water-based soft touch coating, is deposited on the microstructure of the substrate. A second coating, which is a solvent-based superhydrophobic coating, is deposited on the first coating. Doing so provides a coating that provides both soft touch and superhydrophobic properties. Furthermore, by reducing the thickness of the solvent-based coating, VOC emission may also be effectively reduced. In this manner, an effective superhydrophobic soft touch coating may be provided.

Figure 1:
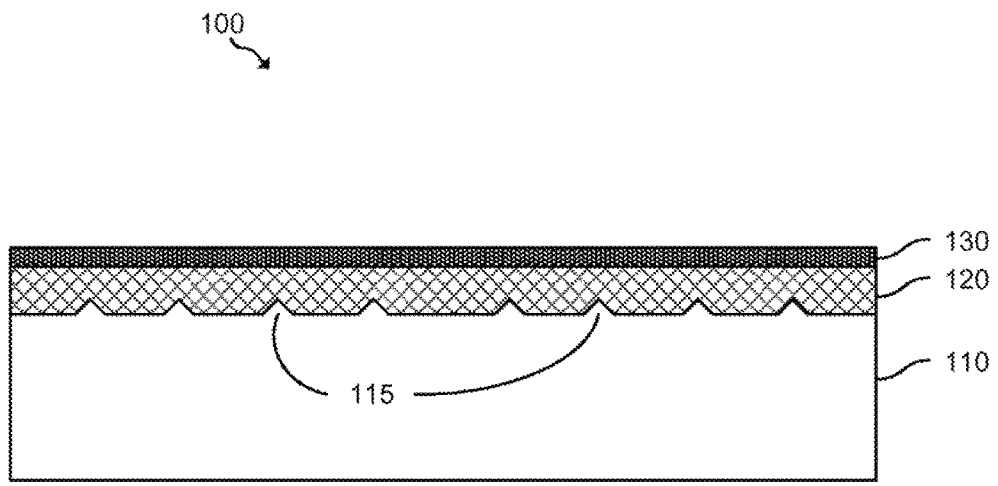
FIG. 1 is a cross-section diagram of an example superhydrophobic soft touch coating on a substrate.

Referring now to the drawings, FIG. 1 depicts a cross-section diagram of an example superhydrophobic soft touch coating 100, which may include a substrate 110, a first coating 120, and a second coating 130. Substrate 110 may have a microstructure 115 on at least a portion of at least one surface of the substrate. First coating 120 is on at least a portion of microstructure 115 and may be a water-based soft touch coating. Second coating 130 is on at least a portion of first coating 120 and may be a solvent-based superhydrophobic coating.

Coating 100 may be a covering that is applied to the surface of a substrate, such as substrate 110. Coating 100 may serve decorative or functional purposes or both. Coating 100 may change the surface properties of substrate 110, such as adhesion, wettability, corrosion resistance, or wear resistance. Particularly, as described herein, coating 100 may provide superhydrophobicity and soft touch properties. Furthermore, in some implementations, coating 100 may provide anti-smudge or anti-fingerprint features.

Substrate 110 may be a material onto which coating 100 may be applied. Substrate 110 may, for example, be any surface on which superhydrophobicity and soft touch features are desired. Substrate 110 may have a number of materials, including metals, plastics, ceramics, carbon fiber, glass, wood, or hybrid composites. In some examples, substrate 110 may be the exterior of a device, such as a mobile computing device. For example, the covering of a mobile device may come into frequent contact with various environments, and functional features may be desired on such surfaces to maintain integrity of the surface.

Substrate 110 may have a microstructure 115 on at least a portion of at least one surface of the substrate. In some examples, all surfaces of the substrate 110 may have microstructure 115. Alternatively, microstructure 115 may be on some surfaces or portions of all or some surfaces. Microstructure 115 is represented in FIG. 1 as pyramid shapes protruding from the surface of substrate 110. However, microstructure 115 may have a number of shapes and orientations. For example, microstructure 115 may be of one configuration on one portion of substrate 110 and another configuration on other portions or surfaces of substrate 110. Microstructure 115 may be a part of the material of substrate 110, and may be formed, for example, by growing the structures out of the surface of the substrate. In another implementation, microstructure 115 may be provided by a film or additional coating layer placed on the surfaces of substrate 110. Microstructure 115 may provide functional properties to the surface of substrate 110, such as providing superhydrophobicity in combination with other coating layers. Further details of microstructure 115 are further discussed with respect to FIG. 2.

First coating 120 may be a coating layer deposited on microstructure 115 of substrate 110 to provide functional properties. First coating 120 may be deposited on the entirety of microstructure 115 or, in some implementations, deposited on portions of microstructure 115. First coating 120 may be a water-based soft touch coating, which may provide a velvety texture. For example, first coating 120 may include a water-based substance into which particles are dispersed. The dispersed particles that may alter the properties of first coating 120. In some examples, first coating 120 may include at least one of a dispersed thermoplastic elastomer and a dispersed thermoset elastomer. Examples of dispersed thermoplastic elastomers include urethanes, styrenic block copolymers, copolyether esters, polyester amides, and other suitable thermoplastic polymers. Examples of dispersed thermoset elastomers include alkyl acrylate copolymers, butadienes, chlorinated polyethylenes, isobutylene-isoprene copolymers, ethylene propylenes, epichlorhydrins, fluoropolymers, hydrogenated nitriles, isoprenes, chloroprenes, polysulphides, nitriles, polyurethanes, silicones, strene butadienes, tetrafluoroethylene propylenes, and other suitable thermoset polymers. First coating 120 may provide functional properties to coating 100, such as soft touch.

Second coating 130 may be a coating layer deposited on first coating 120 to provide functional properties. Second coating 130 may be deposited on the entirety of first coating 120 or, in some implementations, deposited on portions of first coating 120. Second coating 130 may be a solvent-based superhydrophobic coating. For example, second coating 130 may include a solvent-based substance into which particles are dispersed. The dispersed particles may alter the properties of second coating 130. A solvent-based substance may be polyurethane-based, including either thermoplastic or thermoset elastomers or both, with fluoro-polymers in the formulation. In some examples, second coating 130 may include a hydrophobic polymer, examples of which include fluorinated olefin-based polymers, specialty fluroracrylates, fluorosilicone acrylates, fluorourethanes, perfluoropolyethers, perfluoropolyoxetanes, fluorotelomers, polytetrafluoroethylenes, polyvinylidenefluorides, fluorosiloxanes, fluoro UV polymers, and other suitable polymers.

Second coating 130 may provide functional properties to coating 100, such as superhydrophobicity. Superhydrophobic surfaces may be surfaces that are difficult to wet. The contact angle of water droplets on superhydrophobic surfaces may be large, and the roll-off angle hysteresis is small. Superhydrophobicity may be referred to as the lotus effect. The superhydrophobicity of coating 100 may be achieved by a combination of the properties of microstructure 115, first coating 120, and second coating 130. In some implementations, second coating 130 may be a soft touching coating. In further examples, second coating 130 may provide other functional features, such as anti-smudge or anti-fingerprint features.

Second coating 130 may be thinner than first coating 120 in some implementations. A relatively thin second coating 130 may reduce VOC emissions by the solvent-based materials of second coating 130 as compared to thicker solvent-based coatings. Coating 100 may leverage a first coating 120 to provide soft touch properties, while using a thinner second coating 130, in combination with microstructure 115, to provide superhydrophobicity. In some examples, second coating 130 may have a thickness of less than 10 micrometers.

Figure 2:
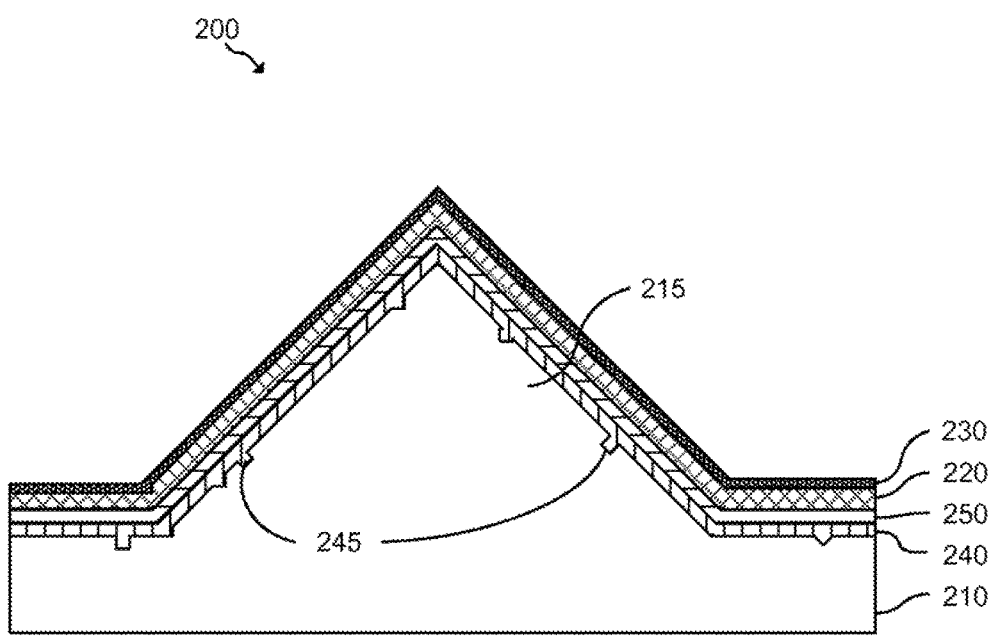
FIG. 2 is a cross-section diagram of an example superhydrophobic soft touch coating on a substrate emphasizing an example microstructure of the substrate.

FIG. 2 depicts a cross-section diagram of an example superhydrophobic soft touch coating 200 on a substrate 210 emphasizing an example microstructure 215 of the substrate. For example, FIG. 2 may depict a zoomed-in view of coating 100 of FIG. 1. Coating 200 may include a substrate 210 with a microstructure 215, a primer coating 240, a base coating 250, a first coating 220, and a second coating 230. Primer coating 240 may be on at least a portion of microstructure 215, and base coating 250 may be on at least a portion of primer coating 240. First coating 220 may be on at least a portion of base coating 250 and may be a water-based soft touch coating. Second coating 230 may be on at least a portion of first coating 220 and may be a solvent-based superhydrophobic coating.

Similar to coating 100 of FIG. 1, coating 200 may be a covering that is applied to the surface of a substrate, such as substrate 210. Coating 200 may change the surface properties of substrate 210, such as adhesion, wettability, corrosion resistance, or wear resistance. Particularly, coating 200 may provide superhydrophobicity and soft touch properties. Furthermore, in some implementations, coating 200 may provide anti-smudge or anti-fingerprint features.

Substrate 210 may be a material onto which coating 200 may be applied. Substrate may, for example, be any surface on which superhydrophobicity and soft touch features are desired. Substrate 210 may be or have a number of materials, and may be, in some examples, the exterior of a device, such as a mobile computing device. For example, the covering of a mobile device may come into frequent contact with various environments, and functional features may be desired on such surfaces to maintain integrity of the surface.

Substrate 210 may have a microstructure 215 on at least a portion of at least one surface of the substrate. FIG. 2 depicts a magnified view of example microstructure 215 on substrate 210; for example, substrate 215 may have a large number of pyramid structures across its surface. While microstructure 215 is represented in FIG. 2 as pyramid shapes protruding from the surface of substrate 210, microstructure 215 may have a number of shapes and orientations. Microstructure 215 may be a part of the surface of substrate 210, and may be formed, for example, by growing the structures out of the material of the substrate. In another implementation, microstructure 215 may be provided by a film or additional coating layer placed on the surfaces of substrate 210. Microstructure 215 may provide functional properties to the surface of substrate 210, such as providing superhydrophobicity in combination with other coating layers.

Primer coating 240 may be a coating layer deposited on microstructure 215 of substrate 210 to prime the surface of the substrate for depositing additional coating layers. In some examples, primer coating 240 may be a powder coat, or include polymers such as acrylics, polyurethanes, and epoxies. Primer coating 240 may provide a number of benefits to substrate 210, including providing a level surface and stabilizing reactive surfaces. As shown in FIG. 2, primer coating 240 may also fill surface cavities 245, resulting in a smoother surface that may be better suited for further coating or have a better appearance.

Base coating 250 may be a coating deposited on primer coating 240 to prepare the surface for deposition of additional layers. In some examples, base coating 250 may include polymers, such as acrylics, polyurethanes, and epoxies. Base coating 250 may aid the adhesion of additional coatings, such as first coating 220 and second coating 230.

First coating 220 may be similar to first coating 120 of FIG. 1. First coating 220 may be a coating layer deposited on base coating 250 to provide functional properties to substrate 210. First coating 220 may be a water-based soft touch coating. For example, first coating 220 may include a water-based substance into which particles are dispersed. The dispersed particles that may alter the properties of first coating 220. In some examples, first coating 220 may include at least one of a dispersed thermoplastic elastomer and a dispersed thermoset elastomer. First coating 220 may provide functional properties to coating 200, such as soft touch.

Similar to second coating 130 of FIG. 1, second coating 230 may be a coating layer deposited on first coating 220 to provide functional properties. Second coating 230 may be a solvent-based superhydrophobic coating. For example, second coating 130 may include a solvent-based substance into which particles are dispersed. The dispersed particles may alter the properties of second coating 230. A solvent-based substance may be polyurethane-based, including either thermoplastic or thermoset elastomers or both, with fluoropolymers in the formulation. In some examples, second coating 130 may include a hydrophobic polymer. Second coating 230 may provide functional properties to coating 200, such as superhydrophobicity. In some implementations, second coating 230 may also be a soft touching coating. In further examples, second coating 230 may provide other functional features, such as anti-smudge or anti-fingerprint features. Second coating 230 may be thinner than first coating 220. A relatively thin second coating 230 may reduce VOC emissions by the solvent-based materials of second coating 230 as compared to thicker solvent-based coatings. In some examples, second coating 230 may have a thickness of less than 10 micrometers.

Figure 3:
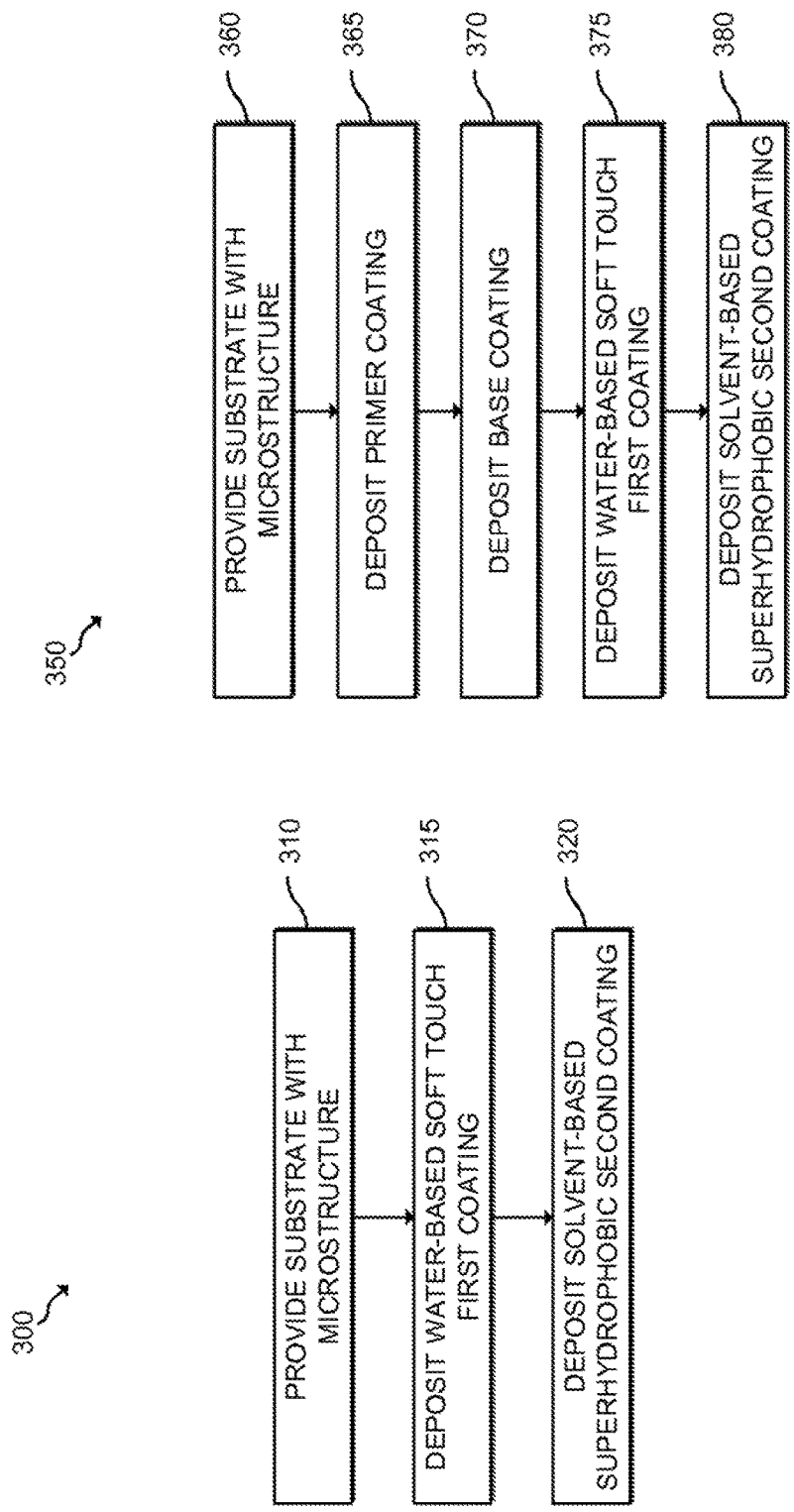
FIG. 3A is a flowchart of an example method for coating a substrate with a superhydrophobic soft touch coating.
FIG. 3B is a flowchart of an example method for coating a substrate with a superhydrophobic soft touch coating including depositing a primer coating and depositing a base coating.

FIG. 3A depicts a flowchart of an example method 300 for coating a substrate with a superhydrophobic soft touch coating, which may include block 310 for providing a substrate with a microstructure, block 315 for depositing a water-based soft touch first coating on the microstructure, and block 320 for depositing a solvent-based superhydrophobic second coating on the first coating. Although the execution of method 300 is herein described in reference to coating substrate 110 with coating 100 of FIG. 1, other suitable parties for implementation of method 300 should be apparent, including, but not limited to, coating 200 of FIG. 2.

Method 300 may start in block 310, where substrate 110 with microstructure 115 on at least a portion of at least one surface of substrate 110 is provided. As described herein, substrate 110 may be a number of materials, and microstructure 115 may be produced by a variety of methods. For example, substrate 110 may be a metal, and microstructure 115 may be formed by pressing or die casting. Alternatively or in addition, microstructure 115 may be provided by an additional film or coating placed on top of a surface of substrate 110. Microstructure 115 may be on parts of or all of one or more surfaces of substrate 110. Furthermore, in some examples, substrate 110 may be subject to a pretreatment or passivation process to prepare the surface.

After providing a substrate, method 300 may proceed to block 315, where a first coating 120 is deposited on at least a portion of microstructure 115. First coating 110 may be a water-based soft-touch coating. Various methods of deposition may be employed to implement block 315. For example, first coating 120 may be deposited using vapor deposition, sputtering, or other methods such as dipping deposition. In some implementations, first coating 120 may include a dispersed thermoplastic elastomer, a dispersed thermoset elastomer, or both. In some examples, additional steps, such as a curing process, may be taken to complete the deposition process.

After depositing first coating 120, method 300 may proceed to block 320, where a second coating 130 is deposited on at least a portion of first coating 120. Second coating 130 may be a solvent-based superhydrophobic coating. In some implementations, second coating 130 may also be a soft touch coating. Furthermore, second coating 130 may be thinner than first coating 120, which may reduce the VOC emissions of coating 100 as opposed to other coatings with similar properties but higher amounts of solvent-based materials. Second coating 130 may be deposited using a number of techniques, including vapor deposition, sputtering, and other methods such as dipping deposition. In some examples, second coating 130 may include a hydrophobic polymer. In some examples, additional steps, such as a curing process, may be taken to complete the deposition process.

FIG. 3B depicts a flowchart of an example method 350 for coating a substrate, such as substrate 210, with a superhydrophobic soft touch coating, such as coating 200, including depositing a primer coating, such as primer coating 240, and depositing a base coating, such as base coating 250. Method 350 may include block 360 for providing a substrate with a microstructure, block 365 for depositing a primer coating on the microstructure, block 370 for depositing a base coating on the primer coating, block 375 for depositing a water-based soft touch first coating on the base coating, and block 380 for depositing a solvent-based superhydrophobic second coating on the first coating. Although the execution of method 350 is herein described in reference to coating substrate 210 with coating 200 of FIG. 2, other suitable parties for implementation of method 300 should be apparent, including, but not limited to, coating 100 of FIG. 1.

Method 350 may start in block 360, where substrate 210 with microstructure 215 is provided. Microstructure 215 may have a variety of shapes and configurations and may be provided by a number of methods. For example, microstructure 215 may be provided by the application of a film on the surface of substrate 210. Alternatively, microstructure 215 may be formed by pressing or die casting of substrate 210. Furthermore, microstructure 215 may be die-casted, pressed, etched, deposited, or grown out of substrate 210. In some implementations, substrate 210 may also be subject to surface cleaning prior to the execution of subsequent blocks of method 350.

After providing the substrate, method 350 may proceed to block 365, where primer coating 240 is deposited on at least a portion of microstructure 215. Primer coating 240 may be a coating layer deposited on microstructure 215 of substrate 210 to prime the surface of the substrate in order to implement subsequent blocks of method 350. In some examples, primer coating 240 may be a powder coat, or include polymers such as acrylics, polyurethanes, and epoxies. Primer coating 240 provide a number of benefits to substrate 210, including provide a level surface and stabilizing reactive surfaces. As shown previously in FIG. 2, primer coating 240 may also fill surface cavities 245, resulting in a smoother surface that may be better suited for further coating or have a better appearance. Various methods of deposition may be employed to implement block 365. For example, primer coating 240 may be deposited using vapor deposition, sputtering, or other methods such as dipping deposition. In some examples, additional steps, such as a curing process, may be taken to complete the deposition process.

After depositing the primer coating, method 350 may proceed to block 370, where base coating 250 is deposited on at least a portion of primer coating 240. Base coating 250 may be deposited on primer coating 240 to prepare the surface for subsequent blocks of method 350. In some examples, base coating 250 may include polymers, such as acrylics, polyurethanes, and epoxies. Base coating 250 may aid the adhesion of additional coatings, such as first coating 220 and second coating 230. Various methods of deposition may be employed to implement block 370. For example, base coating 250 may be deposited using vapor deposition, sputtering, or other methods such as dipping deposition. In some examples, additional steps, such as a curing process, may be taken to complete the deposition process.

After depositing base coating 250, method 350 may proceed to block 375, where first coating 220 is deposited on base coating 250. First coating may be a water-based soft-touch coating. Various methods of deposition may be employed to implement block 375. For example, first coating 220 may be deposited using vapor deposition, sputtering, or other methods such as dipping deposition. In some implementations, first coating 220 may include a dispersed thermoplastic elastomer, a dispersed thermoset elastomer, or both.

After depositing first coating 220, method 350 may proceed to block 380, where a second coating 230 is deposited on at least a portion of first coating 220. Second coating 230 may be a solvent-based superhydrophobic coating. In some implementations, second coating 230 may also be a soft touch coating. Furthermore, second coating 230 may be thinner than first coating 220, which may reduce the VOC emissions of coating 200 as opposed to other coatings with similar properties but higher amounts of solvent-based materials. Second coating 230 may be deposited using a number of techniques, including vapor deposition, sputtering, and other methods such as dipping deposition. In some examples, second coating 230 may include a hydrophobic polymer.

Figure 4:
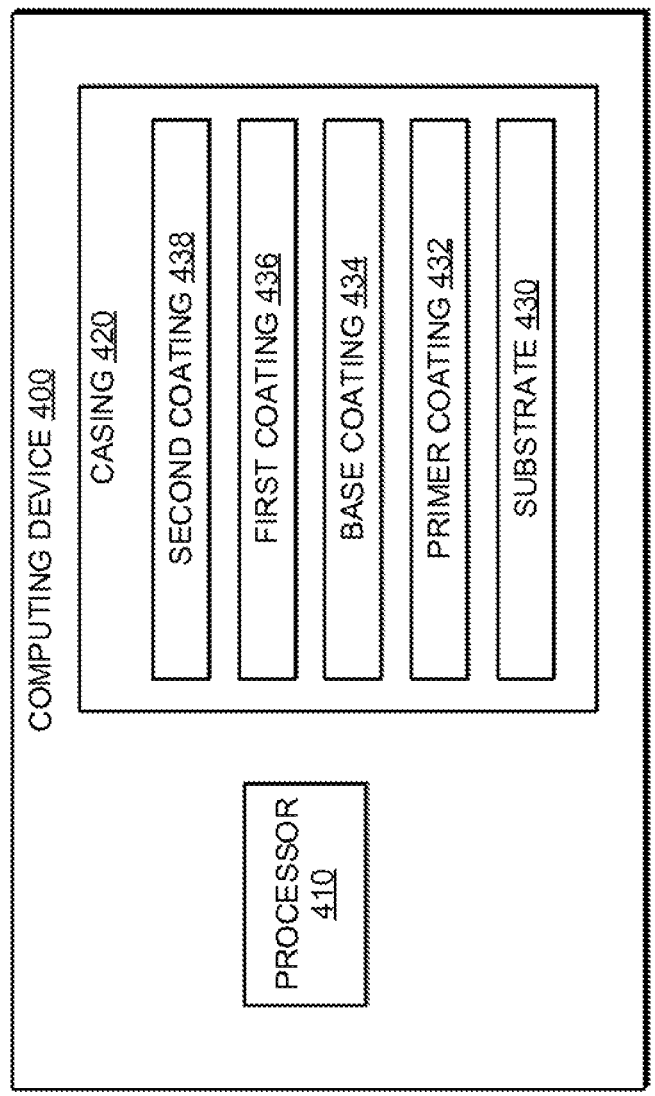
FIG. 4 is a block diagram of an example computing device having a casing with a superhydrophobic soft touch coating deposited on a substrate of the casing.

FIG. 4 depicts a block diagram of an example computing device 400 having a casing 420 with a superhydrophobic soft touch coating deposited on substrate 430 of the casing. Computing device 400 may be, for example, a notebook or desktop computer, a mobile device such as a mobile phone or tablet, a local area network (LAN) server, a web server, a cloud-hosted server, or any other electronic device that has a casing. In the implementation of FIG. 4, computing device 400 includes a processor 410, which may be one or more central processing units (CPUs), semiconductor-based microprocessors, and/or other hardware devices suitable for retrieval and execution of instructions stored in a memory device such as random access memory, machine-readable storage medium, or another form of computer data storage.

Casing 420 may be a physical structure that may enclose components of a computing device. In some implementations, casing 420 may protect the interior components of a device, such as a mobile phone, that is frequently exposed to contact. In such instances, casing 420 may sometimes be referred to as a cover, case, base, or chassis. In some instances, casing 420 may be in the interior of another cover or casing. For example, a computing device with an exterior case may contain various components that may themselves be protected by a casing, such as casing 420.

Casing 420 may include substrate 430, primer coating 432, base coating 434, first coating 436, and second coating 438. Substrate 430 may have a variety of materials as described herein. In mobile applications, certain properties are desired, such as pleasing physical touch as well as ability to repel water and contaminants. Casing 420 may provide soft touch, superhydrophobicity, and other desirable properties by the mechanisms described herein.

What is claimed is:

1. A coated substrate, comprising:
   a substrate, wherein the substrate comprises a microstructure on at least a portion of at least one surface of the substrate;
   a first coating on at least a portion of the microstructure, wherein the first coating is a water-based soft touch coating; and
   a second coating on at least a portion of the first coating, wherein the second coating is a solvent-based superhydrophobic coating.

2. The coated substrate of claim 1, wherein the second coating is thinner than the first coating.

3. The coated substrate of claim 1, wherein the second coating is a soft touch coating.

4. The coated substrate of claim 1, further comprising a base coating on at least a portion of the microstructure, wherein the base coating is between the substrate and the first coating.

5. The coated substrate of claim 4, further comprising a primer coating on at least a portion of the microstructure, wherein the primer coating is between the substrate and the base coating.

6. The coated substrate of claim 1, wherein the microstructure of the substrate is provided by a film deposited on the portions of the surfaces of the substrate.

7. The coated substrate of claim 1, wherein the first coating comprises at least one of a dispersed thermoplastic elastomer and a dispersed thermoset elastomer.

8. The coating of claim 1, wherein the second coating comprises a hydrophobic polymer.

9. The coating of claim 1, wherein emission of volatile organic compounds from the coated substrate is reduced.

10. A method of coating a substrate, comprising:
    providing a substrate, wherein the substrate comprises a microstructure on at least a portion of at least one surface of the substrate;
    depositing a first coating on at least a portion of the microstructure, wherein the first coating is a water-based soft touch coating; and
    depositing a second coating on at least a portion of the first coating, wherein the second coating is a solvent-based superhydrophobic coating and wherein the second coating is thinner than the first coating.

11. The method of claim 10, further comprising:
    depositing a primer coating on at least a portion of the microstructure; and
    depositing a base coating on at least a portion of the primer coating, wherein the first coating is then deposited on at least a portion of the base coating.

12. The method of claim 10, wherein the first coating comprises at least one of a dispersed thermoplastic elastomer and a dispersed thermoset elastomer.

13. The method of claim 10, wherein the second coating is a soft touch coating and wherein the second coating comprises a hydrophobic polymer.

14. A computing device, comprising a processor and a coated casing, wherein the casing comprises:
    a substrate, wherein the substrate comprises a microstructure on at least a portion of at least one surface of the substrate;
    a first coating on at least a portion of the microstructure, wherein the first coating is a water-based soft touch coating; and
    a second coating on at least a portion of the first coating, wherein the second coating is a solvent-based superhydrophobic soft touch coating and wherein the second coating is thinner than the first coating.

15. The computing device of claim 4, wherein emission of volatile organic compounds from the casing is reduced.

* * * * *

UNITED STATES PATENT AND TRADEMARK OFFICE
CERTIFICATE OF CORRECTION

PATENT NO. : 9,873,236 B2
APPLICATION NO. : 15/517699
DATED : January 23, 2018
INVENTOR(S) : Kevin Voss et al.

Page 1 of 1

It is certified that error appears in the above-identified patent and that said Letters Patent is hereby corrected as shown below:

In the Claims

In Column 8, Line 62, in Claim 15, delete "claim 4" and insert -- claim 14 --, therefor.

Signed and Sealed this
Twenty-ninth Day of May, 2018

Andrei Iancu
*Director of the United States Patent and Trademark Office*